US010313227B2

(12) United States Patent
Garcia-Luna-Aceves

(10) Patent No.: US 10,313,227 B2
(45) Date of Patent: Jun. 4, 2019

(54) SYSTEM AND METHOD FOR ELIMINATING UNDETECTED INTEREST LOOPING IN INFORMATION-CENTRIC NETWORKS

(71) Applicant: CISCO TECHNOLOGY, INC., San Jose, CA (US)

(72) Inventor: Jose J. Garcia-Luna-Aceves, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 118 days.

(21) Appl. No.: 14/864,571

(22) Filed: Sep. 24, 2015

(65) Prior Publication Data

US 2017/0093691 A1    Mar. 30, 2017

(51) Int. Cl.

| | |
|---|---|
| *H04L 12/705* | (2013.01) |
| *H04L 12/721* | (2013.01) |
| *H04L 12/709* | (2013.01) |
| *H04L 12/755* | (2013.01) |
| *H04L 12/733* | (2013.01) |
| *H04L 12/725* | (2013.01) |
| *H04L 12/18* | (2006.01) |

(52) U.S. Cl.
CPC ............ *H04L 45/18* (2013.01); *H04L 45/021* (2013.01); *H04L 45/12* (2013.01); *H04L 45/122* (2013.01); *H04L 45/245* (2013.01); *H04L 45/306* (2013.01); *H04L 45/38* (2013.01); *H04L 12/1863* (2013.01)

(58) Field of Classification Search
None
See application file for complete search history.

(56) References Cited

U.S. PATENT DOCUMENTS

| | | |
|---|---|---|
| 817,441 A | 4/1906 | Niesz |
| 4,309,569 A | 1/1982 | Merkle |
| 4,921,898 A | 5/1990 | Lenney |

(Continued)

FOREIGN PATENT DOCUMENTS

| | | |
|---|---|---|
| CN | 103873371 | 6/2014 |
| DE | 1720277 A1 | 6/1967 |

(Continued)

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.

(Continued)

*Primary Examiner* — Kouroush Mohebbi

(57) ABSTRACT

One embodiment of the present invention provides a system for correctly processing interests in an information-centric network (ICN). During operation, the system receives, by a first node in the ICN, an interest for a piece of content from a second node. The interest specifies a name of the content piece. The system determines, based on forwarding information and information associated with pending interests stored on the first node, whether a forwarding condition or an interest aggregation condition is satisfied. In response to the forwarding condition being satisfied, the system forwards the interest. In response to the interest aggregation condition being satisfied, the system aggregates the interest.

24 Claims, 9 Drawing Sheets

(56) References Cited

U.S. PATENT DOCUMENTS

| | | |
|---|---|---|
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,649,109 A | 7/1997 | Griesmer |
| 5,845,207 A | 12/1998 | Amin |
| 5,870,605 A | 2/1999 | Bracho |
| 6,021,464 A | 2/2000 | Yao |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,182,133 B1 | 1/2001 | Horvitz |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,947 B1 | 4/2002 | Kavner |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,834,272 B1 | 12/2004 | Naor |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,233,948 B1 | 6/2007 | Shamoon |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,426,696 B1 | 9/2008 | Hwang |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,535,926 B1 | 5/2009 | Deshpande |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,711,684 B2 | 5/2010 | Sundaresan |
| 7,747,749 B1 | 6/2010 | Aamodt |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,814,425 B1 | 10/2010 | O'Shaugnessy |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,239,331 B2 | 8/2012 | Shanmugavelayutham |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,375,420 B2 | 2/2013 | Farrell |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,688,727 B1 | 4/2014 | Das |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,863,227 B2 | 10/2014 | Zhang |
| 8,868,779 B2 | 10/2014 | ONeill |
| 8,874,842 B1 | 10/2014 | Kimmel |

(56) References Cited

U.S. PATENT DOCUMENTS

| | | |
|---|---|---|
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,009,465 B2 | 4/2015 | Zhang |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |
| 9,280,610 B2 | 3/2016 | Gruber |
| 9,380,326 B1 | 6/2016 | Corley |
| 9,400,852 B2 | 7/2016 | Kim |
| 2001/0051927 A1 | 12/2001 | London |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0049541 A1 | 3/2004 | Swahn |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2004/0267902 A1 | 12/2004 | Yang |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0066121 A1 | 3/2005 | Keeler |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0248078 A1 | 11/2006 | Gross |
| 2006/0256767 A1 | 11/2006 | Suzuki |
| 2006/0268792 A1 | 11/2006 | Belcea |
| 2006/0288237 A1 | 12/2006 | Goodwill |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0156998 A1 | 7/2007 | Gorobets |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082509 A1 | 4/2008 | Bessieres |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123536 A1 | 5/2008 | Johnson |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0244460 A1 | 10/2008 | Louch |
| 2008/0250006 A1 | 10/2008 | Dettinger |
| 2008/0256138 A1 | 10/2008 | Sim-Tang |
| 2008/0256359 A1 | 10/2008 | Kahn |

(56) References Cited

U.S. PATENT DOCUMENTS

| | | |
|---|---|---|
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307286 A1 | 12/2009 | Laffin |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0316052 A1 | 12/2010 | Petersen |
| 2010/0322249 A1 | 12/2010 | Thathapudi |
| 2010/0332595 A1 | 12/2010 | Fullagar |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0079056 A1 | 3/2012 | Turanyi et al. |
| 2012/0102136 A1 | 4/2012 | Srebrny |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158912 A1 | 6/2012 | Jacobson |
| 2012/0158973 A1 | 6/2012 | Jacobson |
| 2012/0163373 A1 | 6/2012 | Lo |
| 2012/0166433 A1 | 6/2012 | Tseng |
| 2012/0166806 A1 | 6/2012 | Zhang |
| 2012/0170913 A1 | 7/2012 | Isozaki |
| 2012/0179653 A1 | 7/2012 | Araki |

(56) References Cited

U.S. PATENT DOCUMENTS

| | | |
|---|---|---|
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0237028 A1 | 9/2012 | Khazan |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0317655 A1 | 12/2012 | Zhang |
| 2012/0322422 A1 | 12/2012 | Frecks |
| 2012/0323933 A1 | 12/2012 | He |
| 2012/0331112 A1 | 12/2012 | Chatani |
| 2013/0016695 A1 | 1/2013 | Ravindran |
| 2013/0024560 A1 | 1/2013 | Vasseur |
| 2013/0039249 A1 | 2/2013 | Ravindran |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091237 A1 | 4/2013 | Ambalavanar |
| 2013/0091539 A1 | 4/2013 | Khurana |
| 2013/0110781 A1 | 5/2013 | Golab |
| 2013/0110987 A1 | 5/2013 | Kim |
| 2013/0111063 A1 | 5/2013 | Lee |
| 2013/0121489 A1 | 5/2013 | Pestoni |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0163758 A1 | 6/2013 | Viswanathan |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0258878 A1 | 10/2013 | Wakikawa |
| 2013/0262365 A1 | 10/2013 | Dolbear |
| 2013/0262698 A1 | 10/2013 | Schwan |
| 2013/0275544 A1 | 10/2013 | Westphal |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332955 A1 | 12/2013 | Hong |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2013/0346877 A1 | 12/2013 | Borovoy |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0023076 A1 | 1/2014 | Calo |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0090761 A1 | 4/2014 | Foucher |
| 2014/0096249 A1 | 4/2014 | Dupont |
| 2014/0096269 A1 | 4/2014 | Amidei |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129690 A1 | 5/2014 | Jaisinghani |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0237095 A1 | 5/2014 | Petker |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1* | 6/2014 | Kim .................. H04L 65/4084 709/204 |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0245359 A1 | 8/2014 | DeFoy |
| 2014/0254595 A1 | 9/2014 | Luo |
| 2014/0280823 A1* | 9/2014 | Varvello ............... H04L 67/327 709/223 |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0036535 A1 | 2/2015 | Mosko |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |

(56) References Cited

U.S. PATENT DOCUMENTS

| | | |
|---|---|---|
| 2015/0095514 A1 | 4/2015 | Yu |
| 2015/0117253 A1 | 4/2015 | Scott |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0222424 A1 | 8/2015 | Mosko |
| 2015/0270957 A1 | 9/2015 | Uzun |
| 2015/0279348 A1 | 10/2015 | Cao |
| 2015/0281071 A1 | 10/2015 | Mosko |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0014027 A1 | 1/2016 | Oran |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0149913 A1 | 5/2016 | Eriksson |
| 2016/0171184 A1 | 6/2016 | Solis |
| 2016/0173604 A1 | 6/2016 | Panigrahi |
| 2017/0078185 A1* | 3/2017 | Yao .......................... H04L 29/06 |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2552083 | 1/2013 |
| EP | 2562978 | 10/2014 |
| EP | 2214356 | 5/2016 |
| EP | 3035611 A1 | 6/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2005041527 | 5/2005 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2011159715 | 12/2011 |
| WO | 2012077073 A1 | 6/2012 |
| WO | 2013123410 | 8/2013 |
| WO | 2014023072 | 2/2014 |
| WO | 2014090761 | 6/2014 |
| WO | 2014102371 | 7/2014 |
| WO | 2015084327 | 6/2015 |

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
"PBC Library-Pairing-Based Cryptography-About," http://crypto.stanford.edu/pbc.downloaded Apr. 27, 2015.
C. Gentry and A. Silverberg. Hierarchical ID-Based Cryptography. Advances in Cryptology—ASIACRYPT 2002. Springer Berlin Heidelberg (2002).
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—CRYPTO 2001, vol. 2139, Springer Berlin Heidelberg (2001).
Anteniese et al., "Improved Proxy Re-Encryption Schemes with Applications to Secure Distributed Storage", 2006.
Xiong et al., "CloudSeal: End-to-End Content Protection in Cloud-based Storage and Delivery Services", 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Lotspiech, S. Nusser, and F. Pestoni. Anonymous Trust: Digit.
J. Shao and Z. Cao. CCA-Secure Proxy Re-Encryption without Pairings. Public Key Cryptography. Springer Lecture Notes in Computer ScienceVolume 5443 (2009).
Gopal et al. "Integrating content-based Mechanisms with hierarchical File systems", Feb. 1999, University of Arizona, 15 pages.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
RTMP (2009). Available online at http://wwwimages.adobe.com/www.adobe.com/content/dam/Adobe/en/devnet/rtmp/pdf/rtmp specification 1.0.pdf.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Mini-conference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.

(56) References Cited

OTHER PUBLICATIONS

"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Hur, "Improving security and efficiency in attribute-based data sharing," IEEE Trans. Knowledge Data Eng., vol. 25, No. 10, pp. 2271-2282, Oct. 2013.
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

(56) References Cited

OTHER PUBLICATIONS

Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.

S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.

(56) References Cited

OTHER PUBLICATIONS

Wang, Jiangzhe et al., "DMND: Collecting Data from Mobiles Using Named Data", Vehicular Networking Conference, 2010 IEEE, pp. 49-56.

Xylomenos, George, et al. "A survey of information-centric networking research." Communications Surveys & Tutorials, IEEE 16.2 (2014): 1024-1049.

Yi, Cheng, et al. 'A case for stateful forwarding plane.' Computer Communications 36.7 (2013): 779-791.

Yi, Cheng, et al. 'Adaptive forwarding in named data networking.' ACM SIGCOMM computer communication review 42.3 (2012): 62-67.

Zahariadis, Theodore, et al. "Trust management in wireless sensor networks." European Transactions on Telecommunications 21.4 (2010): 386-395.

Zhang, et al., "Named Data Networking (NDN) Project", http://www.parc.com/publication/2709/named-data-networking-ndn-project.html, Oct. 2010, NDN-0001, Parc Tech Report.

Zhang, Lixia, et al. 'Named data networking.' ACM SIGCOMM Computer Communication Review 44.3 {2014): 66-73.

Soh et al., "Efficient Prefix Updates for IP Router Using Lexicographic Ordering and Updateable Address Set", Jan. 2008, IEEE Transactions on Computers, vol. 57, No. 1.

Beben et al., "Content Aware Network based on Virtual Infrastructure", 2012 13th ACIS International Conference on Software Engineering.

Biradar et al., "Review of multicast routing mechanisms in mobile ad hoc networks", Aug. 16, Journal of Network and Computer Applications 35 (2012) 221-229.

D. Trossen and G. Parisis, "Designing and realizing and information-centric internet," IEEE Communications Magazing, vol. 50, No. 7, pp. 60-67, Jul. 2012.

Garcia-Luna-Aceves et al., "Automatic Routing Using Multiple Prefix Labels", 2012, IEEE, Ad Hoc and Sensor Networking Symposium.

Gasti, Paolo et al., 'DoS & DDoS in Named Data Networking', 2013 22nd International Conference on Computer Communications and Networks (ICCCN), Aug. 2013, pp. 1-7.

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

Kaya et al., "A Low Power Lookup Technique for Multi-Hashing Network Applications", 2006 IEEE Computer Society Annual Symposium on Emerging VLSI Technologies and Architectures, Mar. 2006.

Hoque et al., "NLSR: Named-data Link State Routing Protocol", Aug. 12, 2013, ICN'13.

Nadeem Javaid, "Analysis and design of quality link metrics for routing protocols in Wireless Networks", PhD Thesis Defense, Dec. 15, 2010, Universete Paris-Est.

Wetherall, David, "Active Network vision and reality: Lessons form a capsule-based system", ACM Symposium on Operating Systems Principles, Dec. 1, 1999. pp. 64-79.

Kulkarni A.B. et al., "Implementation of a prototype active network", IEEE, Open Architectures and Network Programming, Apr. 3, 1998, pp. 130-142.

Xie et al. "Collaborative Forwarding and Caching in Content Centric Networks", Networking 2012.

Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.

Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.

Tiancheng Zhuang et al. "Managing Ad Hoc Networks of Smartphones", International Journal of Information and Education Technology, Oct. 1, 2013.

Amadeo et al. "Design and Analysis of a Transport-Level Solution for Content-Centric VANETs", University "Mediterranea" of Reggio Calabria, Jun. 15, 2013.

Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].

Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.

Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]-[006], [0011], [0013]* * figures 1,2*.

Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.

Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.

Priya Mahadevan et al. "CCN-KRS", Proceedings of the 1st International Conference on Information-Centric Networking, Inc. '14, Sep. 24, 2014.

Flavio Roberto Santos Et al. "Funnel: Choking Polluters in BitTorrent File Sharing Communities", IEEE Transactions on Network and Service Management, IEEE vol. 8, No. 4, Dec. 1, 2011.

Liu Wai-Xi et al: "Multisource Dissemination in content-centric networking", 2013 Fourth International conference on the network of the future (NOF), IEEE, Oct. 23, 2013, pp. 1-5.

Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.

Asokan et al.: "Server-Supported Signatures", Computer Security Esorics 96, Sep. 25, 1996, pp. 131-143, Section 3.

Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.

Sun et al.: "Content-Based Route Lookup Using CAMs", Global Communications Conference, IEEE, Dec. 3, 2012 *The Whole Document*.

Gelenbe et al.: "Networks With Cognitive Packets", Modeling, Analysis and Simulation of Computer and Telecommunication Systems, 2000. IEEE, Aug. 29, 2000, pp. 3-10.

Vangelis et al.: "On the Role of Semantic Descriptions for Adaptable Protocol Stacks in the Internet of Things", 2014 28th International Conference on Advanced Information Networking and Applications Workshops, IEEE, May 13, 2014, pp. 437-443, *last paragraph of section II.B*.

Smetters et al. "Securing Network Content" Technical Report, PARC TR-2009-1, Oct. 1 2009, Retrieved from the internet URL:http://www.parc.com/content/attachments/TR-2009-01.pdf [retrieved Nov. 1, 2016].

Marc Mosko "CCNx Label Forwarding (CCNLF)" Jul. 21, 2014.

Gallo Alcatel-Lucent Bell Labs "Content-Centric Networking Packet Header Format" Jan. 26, 2015.

Huard J-F et al. "A Programmable Transport Architecture with QOS Guarantees" IEEE Communications Magazine, vol. 36, No. 10, Oct. 1, 1998.

Microsoft Computer Dictionary, Fifth Edition, 2002, Microsoft Press, p. 23.

(56) References Cited

OTHER PUBLICATIONS

Mind—A Brief Introduction, John R. Searle, 2004, Oxford University Press, pp. 62-67.
J.J. Garcia-Luna-Aceves "Name-Based Content Routing in Information Centric Networks Using Distance Information", Proceedings of the 1st International Conference on Information-Centric Networking, INC '14, Sep. 24, 2014, pp. 7-16, *p. 10, left-hand column, first paragraph*.
Lan Wang et al.: "OSPFN: An OSPF Based Routing Protocol for Named Data Networking", Jul. 25, 2012, URL: http://new.named-data.net/wp-content/uploads/TROSPFN.pdf [Retreived on Jul. 25, 2012], *section 3.1; p. 4*.
Extended European Search Report in counterpart European Application No. 16188662.7, dated Feb. 8, 2017, 7 pages.
Garcia-Luna-Aceves, et al., "Enabling Correct Interest Forwarding and Retransmissions in a Content Centric Network," 2015 ACM/IEEE Symposium on Architectures for Networking and Communications Systems (ANCS), May 2015, 12 pages.

\* cited by examiner

FORWARDING INFORMATION BASE 300

| NAME PREFIX | NEIGHBOR p | NEIGHBOR q |
|---|---|---|
| $n(1)^*$ | $p$, DISTANCE TO $n(1)^*$ FROM $p$ | $q$, DISTANCE TO $n(1)^*$ FROM $q$ |
| ⋮ | ⋮ | ⋮ |
| $n(j)^*$ | $p$, DISTANCE TO $n(j)^*$ FROM $p$ | $q$, DISTANCE TO $n(j)^*$ FROM $q$ — 302 |
| ⋮ | ⋮ | ⋮ |

FIG. 3

PENDING INTEREST TABLE 400

| NAME | FLAG | DISTANCE | INCOMING NEIGHBORS | OUTGOING NEIGHBORS | NUMBER OF ALLOWED RETRANSMISSIONS | REMAINING LIFETIME |
|---|---|---|---|---|---|---|
| $n(1)$ | $s(PIT_{n(1)}^i)$ | $D(i, n(1))$ | INSET $(PIT_{n(1)}^i)$ | OUTSET $(PIT_{n(1)}^i)$ | $rc(PIT_{n(1)}^i)$ | $RT(n(1)^i)$ |
| ... | ... | ... | ... | ... | ... | ... |
| $n(j)$ | $s(PIT_{n(j)}^i)$ | $D(i, n(j))$ | INSET $(PIT_{n(j)}^i)$ | OUTSET $(PIT_{n(j)}^i)$ | $rc(PIT_{n(j)}^i)$ | $RT(n(j)^i)$ |
| ... | ... | ... | ... | ... | ... | ... |

Interest-Processing Algorithm at Router $i$

1: function Process Interest
2: INPUT: $PIT^i$, $CS^i$, $FIB^i$, $I_k[n(j)]$;
3: if $n(j) \in CS^i$ then send $D_i[n(j), sp(j)]$ to $k$
4: if $n(j) \notin CS^i$ then
5:     if $n(j) \notin PIT^i$ then   % No prior Interest is pending for $n(j)$
6:         if $n(j)^* \notin FIB^i$ then % No route exists to $n(j)^*$:
7:             send $NI_i[n(j), \text{no route}]$ to $k$; drop $I_k[n(j)]$
8:         else
9:             for each $v \in N^i$ by rank do
10:                 if $D(i, n(j)^*, k) > D(i, n(j)^*, v)$ then
11:                     % Interest can be sent to $v$:
                      create $PIT^i_{n(j)}$;
                      $INSET(PIT^i_{n(j)}) = \{k\}$; $OUTSET(PIT^i_{n(j)}) = \{v\}$;
                      $RT(PIT^i_{n(j)}) = MIL$; send $I_i[n(j)]$ to $v$; return
12:                 end if
13:             end for
14:             % Interest may be traversing a loop:
                send $NI_i[n(j), \text{loop}]$ to $k$; drop $I_k[n(j)]$
15:         end if
16:     else
17:         % There is a PIT entry for $n(j)$:
18:         if $D(i, n(j)^*, k) > D(i, n(j))$ then
19:             % Interest can be aggregated
                $INSET(PIT^i_{n(j)}) = INSET(PIT^i_{n(j)}) \cup k$
20:         else
21:             % Interest may be traversing a loop:
                send $NI_i[n(j), \text{loop}]$ to $k$; drop $I_k[n(j)]$
22:         end if
23:     end if
24: end if
25: end function

SYSTEM AND METHOD FOR ELIMINATING UNDETECTED INTEREST LOOPING IN INFORMATION-CENTRIC NETWORKS

BACKGROUND

Field

The present disclosure relates generally to information-centric networks (ICNs). More specifically, the present disclosure relates to an ICN architecture that can eliminate undetected Interest loops.

Related Art

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. The two most ubiquitous protocols, the Internet Protocol (IP) and Ethernet protocol, are both based on end-host addresses. That is, a consumer of content can only receive the content by explicitly requesting the content from an address (e.g., IP address or Ethernet media access control (MAC) address) that is typically associated with a physical object or location. This restrictive addressing scheme is becoming progressively more inadequate for meeting the ever-changing network demands.

Recently, information-centric network (ICN) architectures have been proposed in the industry where content is directly named and addressed. Content-Centric Networking (CCN) and Named Data Networking (NDN) are the leading Interest-based ICN approaches. For example, in CCN, instead of viewing network traffic at the application level as end-to-end conversations over which content travels, content is requested or returned based on its unique name. The network is responsible for routing content from the provider to the consumer. Note that content includes data that can be transported in the communication system, including any form of data, such as text, images, video, and/or audio. A consumer and a provider can be a person at a computer or an automated process inside or outside the CCN. A piece of content can refer to the entire content or a respective portion of the content. For example, a newspaper article might be represented by multiple pieces of content embodied as data packets. A piece of content can also be associated with metadata describing or augmenting the piece of content with information, such as authentication data, creation date, content owner, etc.

One problem facing the current ICN architectures is that Interest loops may go undetected when Interests from different consumers requesting the same content are aggregated and Interests are forwarded along routing loops, which may occur due to failures or congestion. Current forwarding strategies may use nonces and the names of named data objects (NDOs) as the basis of Interest loop detection. However, such forwarding strategies often cannot work correctly in the presence of Interest aggregation. Certain improved forwarding strategies provide a remedy to the Interest loop detection problem by requesting Interests to state a hop count to an intended name prefix. However, such an approach requires changing the format of the Interest and requires that the routing protocol operating in the control plane of the network maintains hop counts to name prefixes in addition to any other type of distance information that may be used in the network (e.g., congestion- or delay-based distances). Such a solution is, therefore, undesirable. In addition, the hop count to name prefixes may not be enforceable across autonomous systems.

SUMMARY

One embodiment of the present invention provides a system for correctly processing interests in an information-centric network (ICN). During operation, the system receives, by a first node in the ICN, an interest for a piece of content from a second node. The interest specifies a name of the content piece. The system determines, based on forwarding information and information associated with pending interests stored on the first node, whether a forwarding condition or an interest aggregation condition is satisfied. In response to the forwarding condition being satisfied, the system forwards the interest. In response to the interest aggregation condition being satisfied, the system aggregates the interest.

In a variation on this embodiment, the forwarding information includes one or more entries associated with the name of the content piece, with a respective entry specifying a next hop neighbor through which the first node can forward the interest to a destination node storing the content piece. The entry further specifies a distance from the next hop neighbor to the destination node.

In a further variation, the forwarding condition is satisfied if a distance specified by at least one entry of the forwarding information is less than a distance from the second node to the destination node.

In a further variation, the entry further specifies a ranking of the next hop neighbor, and the interest is forwarded to a next hop neighbor that is highest ranked among neighbors that satisfy the forwarding condition.

In a variation on this embodiment, the information associated with pending interests includes an entry associated with the name of the content piece, and the entry specifies a distance from the first node to a destination node storing the content piece.

In a further variation, the interest aggregation condition is satisfied if the distance specified by the entry is less than a distance from the second node to the destination node.

In a further variation, the entry further specifies a set of incoming neighbors from which interests for the content piece are received, and the interest is aggregated by adding the second node to the set of incoming neighbors.

In a variation on this embodiment, in response to neither the forwarding condition nor the interest aggregation condition being satisfied, the system drops the interest and sends a control message back to the second node.

BRIEF DESCRIPTION OF THE FIGURES

FIG. 3 presents a diagram illustrating an exemplary Forwarding Information Base (FIB), in accordance with an embodiment of the present invention.

FIG. 4 presents a diagram illustrating an exemplary Pending Interest Table (PIT), in accordance with an embodiment of the present invention.

FIG. 6 presents a diagram illustrating an exemplary Interest-processing algorithm, in accordance with an embodiment of the present invention.

In the figures, like reference numerals refer to the same figure elements.

DETAILED DESCRIPTION

Overview

Figure 1:
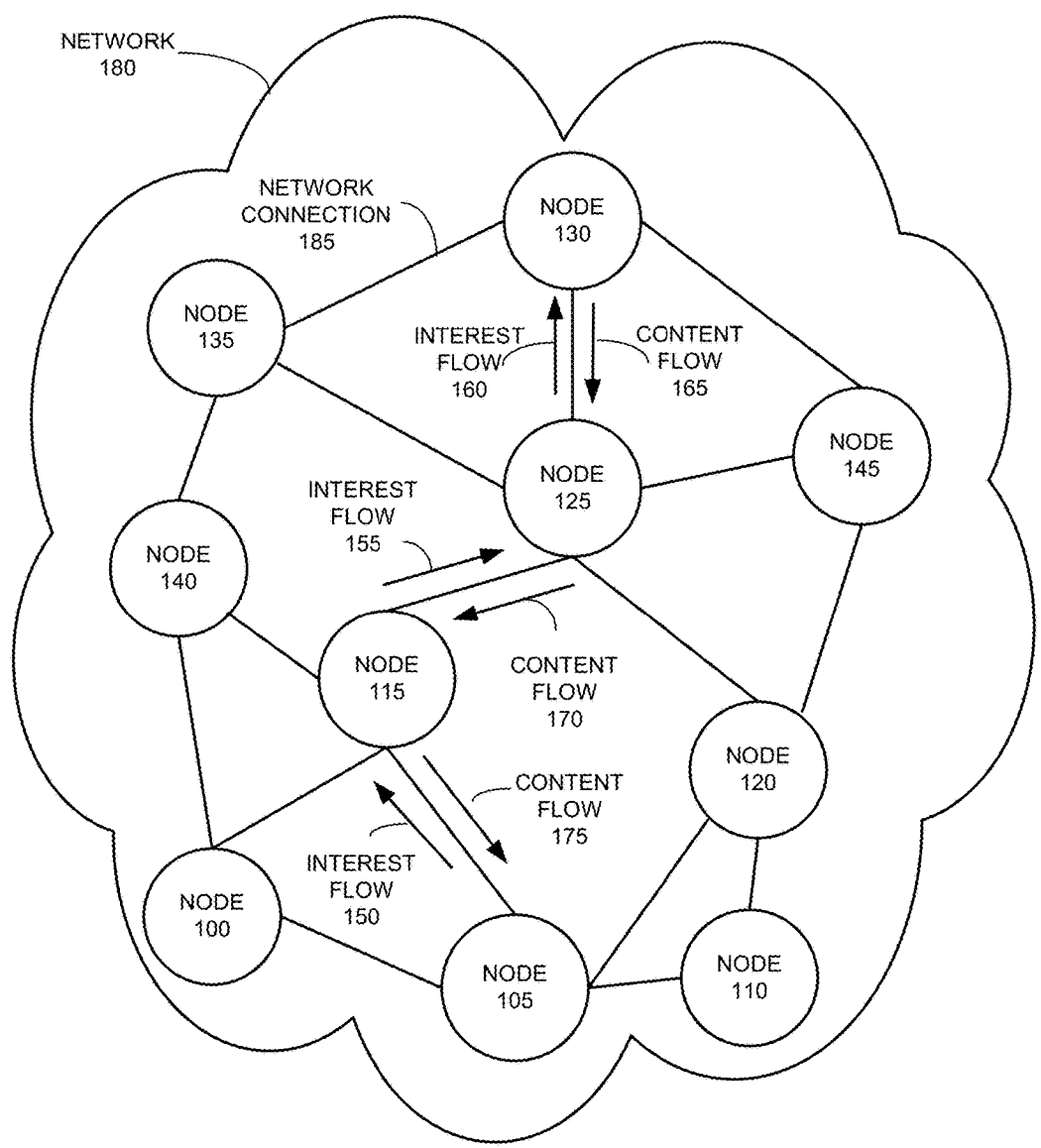
FIG. 1 illustrates an exemplary architecture of a network, in accordance with an embodiment of the present invention.

Embodiments of the present invention provide a CCN system that can detect Interest looping in the presence of Interest aggregation without the need to modify the Interest format. More specifically, the CCN system detects Interest loops based on a simple look-up of an expanded Forwarding Information Base (FIB), which stores the distances to name prefixes reported by all neighbors of a content router.

CCN Architecture

In general, CCN uses two types of messages: Interests and Content Objects. An Interest carries the hierarchically structured variable-length identifier (HSVLI), also called the "name," of a Content Object and serves as a request for that object. If a network element (e.g., router) receives multiple Interests for the same name, it may aggregate those Interests. A network element along the path of the Interest with a matching Content Object may cache and return that object, satisfying the Interest. The Content Object follows the reverse path of the Interest to the origin(s) of the Interest.

The terms used in the present disclosure are generally defined as follows (but their interpretation is not limited to such):

"HSVLI:" Hierarchically structured variable-length identifier, also called a Name. It is an ordered list of Name Components, which may be variable length octet strings. In human-readable form, it can be represented in a format such as ccnx:/path/part. Also, the HSVLI may not be human-readable. As mentioned above, HSVLIs refer to content, and it is desirable that they be able to represent organizational structures for content and be at least partially meaningful to humans. An individual component of an HSVLI may have an arbitrary length. Furthermore, HSVLIs can have explicitly delimited components, can include any sequence of bytes, and are not limited to human-readable characters. A longest-prefix-match lookup is important in forwarding packets with HSVLIs. For example, an HSVLI indicating an Interest in "/parc/home/bob" will match both "/parc/home/bob/test.txt" and "/parc/home/bob/bar.txt." The longest match, in terms of the number of name components, is considered the best because it is the most specific. Detailed descriptions of the HSVLIs can be found in U.S. Pat. No. 8,160,069, entitled "SYSTEM FOR FORWARDING A PACKET WITH A HIERARCHICALLY STRUCTURED VARIABLE-LENGTH IDENTIFIER," by inventors Van L. Jacobson and James D. Thornton, filed 23 Sep. 2009, the disclosure of which is incorporated herein by reference in its entirety.

"Interest:" A request for a Content Object. The Interest specifies an HSVLI name prefix and other optional selectors that can be used to choose among multiple objects with the same name prefix. Any Content Object whose name matches the Interest name prefix (and, optionally, other requested parameters such as publisher key-ID match) satisfies the Interest.

"Content Object:" A data object sent in response to an Interest. It has an HSVLI name and a Content payload that are bound together via a cryptographic signature. Optionally, all Content Objects have an implicit terminal name component made up of the SHA-256 digest of the Content Object. In one embodiment, the implicit digest is not transferred on the wire, but is computed at each hop, if needed. In this disclosure, the term "Content Object" and the term "Named Data Object (NDO)" are exchangeable.

"Face:" In CCN, the term face is a generalization of the concept of an interface. A face may be a connection to a network or directly to an application party. A face may be configured to send and receive broadcast or multicast packets on a particular network interface, or to send and receive packets using point-to-point addressing in the underlying transport, or using a tunnel (for example a TCP tunnel). A face may also be the connection to a single application process running on the same machine, via an encapsulation like UDP or an OS-specific inter-process communication path. All messages arrive through a face and are sent out through a face. In this disclosure, the term "neighbor" is interchangeable with the term "face," referring to an incoming or outgoing interface of an Interest.

As mentioned before, an HSVLI indicates a piece of content, is hierarchically structured, and includes contiguous components ordered from a most general level to a most specific level. The length of a respective HSVLI is not fixed. In content-centric networks, unlike a conventional IP network, a packet may be identified by an HSVLI. For example, "abcd/bob/papers/ccn/news" could be the name of the content and identifies the corresponding packet(s), i.e., the "news" article from the "ccn" collection of papers for a user named "Bob" at the organization named "ABCD." To request a piece of content, a node expresses (e.g., broadcasts) an Interest in that content by the content's name. An Interest in a piece of content can be a query for the content according to the content's name or identifier. The content, if available in the network, is sent back from any node that stores the content to the requesting node. The routing infrastructure intelligently propagates the Interest to the prospective nodes that are likely to have the information and then carries available content back along the reverse path traversed by the Interest message. Essentially the Content Object follows the breadcrumbs left by the Interest message, thus reaching the requesting node.

FIG. 1 illustrates an exemplary architecture of a network, in accordance with an embodiment of the present invention. In this example, a network 180 comprises nodes 100-145. Each node in the network is coupled to one or more other nodes. Network connection 185 is an example of such a connection. The network connection is shown as a solid line, but each line could also represent sub-networks or super-networks, which can couple one node to another node. Network 180 can be content-centric, a local network, a super-network, or a sub-network. Each of these networks can be interconnected so that a node in one network can reach a node in other networks. The network connection can be broadband, wireless, telephonic, satellite, or any type of network connection. A node can be a computer system, an end-point representing users, and/or a device that can generate Interest or originate content.

In accordance with an embodiment of the present invention, a consumer can generate an Interest for a piece of content and forward that Interest to a node in network 180. The piece of content can be stored at a node in network 180 by a publisher or content provider, who can be located inside or outside the network. For example, in FIG. 1, the Interest in a piece of content originates at node 105. If the content is not available at the node, the Interest flows to one or more nodes coupled to the first node. For example, in FIG. 1, the Interest flows (Interest flow 150) to node 115, which does not have the content available. Next, the Interest flows (Interest flow 155) from node 115 to node 125, which again does not have the content. The Interest then flows (Interest flow 160) to node 130, which does have the content available. The flow of the Content Object then retraces its path in reverse (content flows 165, 170, and 175) until it reaches node 105, where the content is delivered. Other processes such as authentication can be involved in the flow of content.

In network 180, any number of intermediate nodes (nodes 100-145) in the path between a content holder (node 130) and the Interest generation node (node 105) can participate in caching local copies of the content as it travels across the network. Caching reduces the network load for a second subscriber located in proximity to other subscribers by implicitly sharing access to the locally cached content.

In existing CCNs or NDNs, each node (also called as a router) maintains three major data structures, including a Forwarding Information Base (FIB), a Content Store (CS), and a Pending Interest Table (PIT). The forwarding plane uses information stored in these three tables to forward Interests toward nodes advertising having copies of requested content, and to send NDOs or other responses back to consumers who requested them over reverse paths traversed by the Interests.

FIB is used to forward Interest packets toward potential source(s) of matching Content Objects. Typically, a routing protocol is used to populate the FIB among all nodes in the network. In conventional CCNs, the FIB entries are often indexed by the name prefixes, with each entry including a physical address of at least one face to which the matching Interest should be forwarded. In NDNs, the FIB entry for a name prefix also contains a stale time after which the entry could be deleted, the round-trip time through the interface, a rate limit; and status information stating whether it is known or unknown that the interface can or cannot bring data back. While forwarding Interest messages, longest-prefix-match lookups of names are performed at the FIB to find a matching entry.

Content Store (CS) is similar to the buffer memory used in an IP router. More particularly, CS temporarily buffers Content Objects that pass through this node, allowing efficient data retrieval by different consumers. When a router receives an Interest packet, it first checks whether there is a matching Content Object in its content store prior to issuing an Interest upstream.

Pending Interest Table (PIT) serves as a cache of Interest state. The PIT keeps track of Interests forwarded upstream toward content source(s) so that a returned Content Object or NDO can be sent downstream following the reverse Interest path to its requester(s). This preserves upstream and downstream network flow. CCN and NDN can also use PITs to allow Interests to not disclose their sources and to enable Interest aggregation. Only Interest packets are routed. The returning Content Object or NDO follows the trail of the Interest packet back to the content requester. A PIT entry consists of a vector of one or more tuples, one for each nonce processed for the same NDO name. Each tuple states the nonce used, the incoming interfaces, and the outgoing interfaces. Each PIT entry has a lifetime larger than the round-trip time to a node where the NDO can be found.

When an Interest packet arrives at a router on a certain face, a longest-match lookup can be done based on the content name, or the HSVLI. The index structure used for the name lookup is ordered in such a way that a CS match will be preferred over a PIT match, which will be preferred over an FIB match. Hence, if there is already a Content Object in CS that matches the Interest, the Content Object will be sent out via the face the Interest arrived on and the Interest will be discarded. Otherwise, the PIT will be checked to see if a match can be found. In NDN, if the Interest states a nonce that differs from those stored in the PIT entry for the requested content, then the router "aggregates" the Interest by adding the incoming face from which the Interest was received and the nonce to the PIT entry without forwarding the Interest. On the other hand, if the same nonce in the Interest is already listed in the PIT entry for the requested content, the router sends a NACK over the reverse path traversed by the Interest. In CCN, aggregation can be done if the Interest is received from a face that is not listed in the PIT entry for the requested content, and a repeated Interest received from the same face is simply dropped.

If a router does not find a match in its CS and PIT, the router forwards the Interest along a route listed in its FIB for the best prefix match. In NDN, a router can select a face to forward an Interest if it is known that it can bring content and its performance is ranked higher than other faces that can also bring content. The ranking of the faces can be done by a router independently of other routers.

Undetected Interest Looping

Figure 2A:
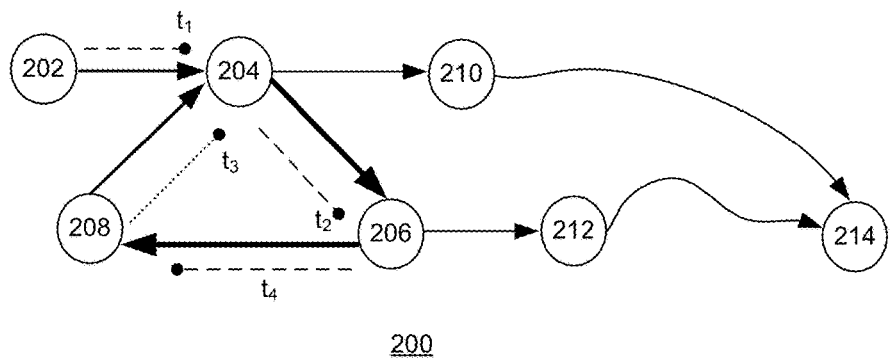
FIG. 2A presents a diagram illustrating an exemplary Interest looping in an information-centric network (ICN).

FIG. 2A presents a diagram illustrating an exemplary Interest looping in an information-centric network (ICN). In FIG. 2A, network 200 includes a number of interconnected routers, such as routers 202-214. Arrowed lines in FIG. 2A indicate the next hops to content advertised by router 214 according to the FIB entries stored in each router. As one can see, a loop exists consisting of routers 204, 206, and 208. An Interest can be forwarded from router 204 to routers 206, 208, and back to router 204. In FIG. 2A, thicker lines indicate that the perceived performance of a neighbor is better than neighbors shown with thinner lines. For example, to router 204, router 206 is a better performing neighbor than router 210. One can see from FIG. 2A that, because the multiple paths implied in FIBs is not loop-free, a long-term Interest loop can exist, even though all routing tables are consistent. In this case, the ranking of neighbors in an FIB can be such that a path with a larger hop count may be ranked higher than a path with a smaller hop count, because of the perceived performance of the faces or paths toward prefixes.

Also in FIG. 2A, the dashed lines indicate the traversal of Interests over links and paths, with different dashed patterns representing Interests with different originators, thus having different nonces. The time when an event arrives at a router is indicated by $t_1$. For example, router 204 receives an Interest from router 202 at $t_1$, and receives an Interest for the same name but with a different nonce from router 208 at $t_3$. Similarly, router 208 receives an Interest from router 206 at $t_4$. Ideally, an Interest loop can be detected if a router notices that it receives a same Interest, as identified by the NDO name and the nonce, that was previously sent out by itself.

However, in the example shown in FIG. 2A, due to Interest aggregation, router 204 is not able to detect the looping of the Interest. More specifically, FIG. 2A shows that router 208 receives an Interest (n(j),nonce$_1$), which is the same Interest sent from router 202 to router 204, from router 206 at t$_4$. However, instead of forwarding such an Interest to router 204, router 208 aggregates this Interest with the Interest of a different nonce, (n(j),nonce$_2$) arrived at router 204 at t$_3$. In other words, router 204 only sees (n(j),nonce$_2$) sent from router 208. Similarly, router 204 also aggregates the Interest received from router 208 (i.e., (n(j),nonce$_2$)), and only sends out the Interest received from router 202 (i.e., (n(j),nonce$_1$)). Therefore, an Interest loop is formed without being detected by router 204.

Figure 2B:
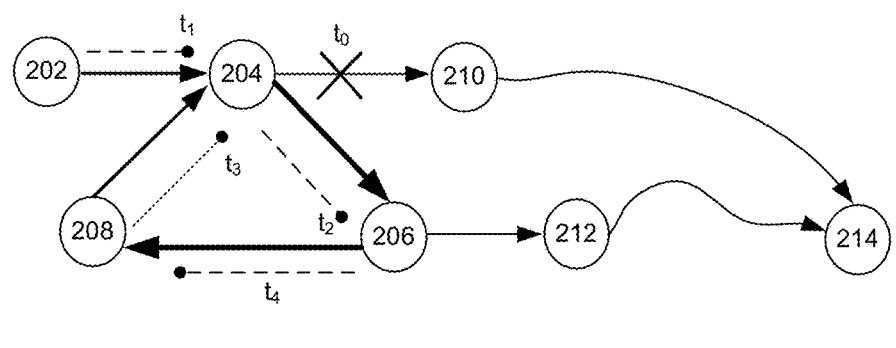
FIG. 2B presents a diagram illustrating an exemplary Interest looping in an ICN.

Moreover, in situations where routing tables are inconsistent as a result of network or content dynamics, Interest loops can go undetected even if the control plane supports only single-path routing to content. FIG. 2B presents a diagram illustrating an exemplary Interest looping in an ICN. FIG. 2B shows the same exemplary network 200 shown in FIG. 2A, except that, in the example shown in FIG. 2B, the routing is single path, and the network topology changes at t$_1$, when the link between routers 204 and 210 fails. Similar to the example shown in FIG. 2A, router 204 aggregates the Interest from router 208 and router 208 aggregates the Interest from router 206, and these combined steps preclude the detection of the temporary Interest looping. In this example, it would appear that the looping problems can be avoided by forcing router 206 to use router 212 rather than router 208 for Interests regarding prefixes announced by router 214. However, the same looping problems would exist if link (node 206, node 212) were removed in the example. Note that the ways in which FIBs are populated and faces are ranked are independent of updates made to PITs.

Indeed, one can prove that the NDN forwarding strategy is not safe in a stable, error-free network in which Interest loops occur, even if nonces were to denote Interests uniquely. In addition, it can also be proven that no forwarding strategy with Interest aggregation and Interest loop detection based on the matching of Interest-identification data is safe. A simplified proof is to map the Interest-processing strategy of the NDN, and any forwarding strategy that attempts to detect Interest loops by matching Interest-identification data, to the problem of distributed termination detection over a cycle, where Interests serve as the tokens of the algorithm. Interest aggregation erases a token traversing the ring (Interest loop) when any node in the ring has previously created a different token; therefore, correct termination detection over the ring (i.e., Interest loop detection) cannot be guaranteed in the presence of Interest aggregation. An Interest cannot recirculate along a routing loop forever, because the corresponding PIT entries will eventually time out given that no responses are sent to the aggregated Interests that traverse routing loops. However, the undetected Interest loops can cause large increases in end-to-end delays and the number of PIT entries stored by content routers, even for small percentages of Interests traversing the loops.

CCN with Extended Look-up of FIB (CCN-ELF)

The CCN-ELF approach ensures that no Interest loops go undetected, even when Interests are aggregated, and without requiring any changes to the packet formats used in NDN and CCN; this is contrary to other loop-detecting solutions that rely on Interest to carry hop count information.

During operation, CCN-ELF ensures correct forwarding of Interests, NDOs, and control messages (e.g., NACKs) by using the name of the NDOs and distance information stored in the FIBs. Note that the distance information can allow routers to forward Interests toward the nearest instances of requested content, rather than flooding the network with Interests or carrying out random walks of the network searching for content. The same information can also be used to ensure that Interests are forwarded in a way that gets them closer to nodes that advertised the requested content.

In this disclosure, the name of NDO j is denoted by n(j), and the terms "neighbor" and "face" are used interchangeably. The set of neighbors of router i is denoted by $N^i$. An Interest forwarded by node k requesting NDO n(j) is denoted by $I_k[n(j)]$. An NDO sent by router k in response to an Interest is denoted by $D_k[n(j),sp(j)]$, with sp(j) being the security payload used optionally to validate the Content Object. The NACK to an Interest sent by router k is denoted by $NI_k[n(j), CODE]$, which states the name of the NDO (n(j) and a code (CODE) indicating the reason why the NACK was sent.

FIG. 3 presents a diagram illustrating an exemplary Forwarding Information Base (FIB), in accordance with an embodiment of the present invention. In FIG. 3, FIB 300 includes a number of entries indexed using content name prefixes. Each entry includes a set of tuples, one for each neighbor of the current router to the corresponding name prefix. For example, entry 302 corresponds to name prefix n(j)* and includes a number of tuples. The tuple for neighbor p states the name of neighbor p and the distance (e.g., hop count) from neighbor p to name prefix n(j)*. Similarly, the tuple for neighbor q states the name of neighbor q and the distance from neighbor q to name prefix n(j)*. For notation purposes, the FIB at router i is denoted as $FIB^i$, the FIB entry for a name prefix n(j)* is denoted as $FIB_{n(j)*}^i$, and the distance from neighbor q to name prefix n(j)* is denoted as D(i,n(j)*,q). In addition to the distance to the prefix from its neighbors, in some embodiments, the FIB of a router may also store the rankings of the neighbors. Such rankings can also play an important role in the Interest-forwarding process.

FIG. 4 presents a diagram illustrating an exemplary Pending Interest Table (PIT), in accordance with an embodiment of the present invention. In FIG. 4, PIT 400 includes a number of entries indexed using names of the NDOs. At router i, the PIT is denoted as $PIT^i$, and $PIT_{n(j)}^i$ denotes the entry created in $PIT^i$ with name n(j). Each entry in the PIT specifies the name of the NDO, a flag stating whether the Interest has been satisfied with an NDO, a distance assumed by the router when it forwards the Interest, the set of incoming neighbors from which Interests for the NDO are received, the set of outgoing neighbors to whom the router forwards its Interests, the number of retransmissions allowed for the same Interest, and the remaining lifetime for the Interest. The notation for each component of the PIT entry is illustrated in FIG. 4. For example, PIT entry $P/T_{n(j)}^i$, or entry 402 in FIG. 4, includes an NDO name n(j); a flag $s(PIT_{n(j)}^i)$; a distance D(i, n(j)) assumed by router i when it forwards Interest $I_i[n(j)]$ to name prefix n(j)*; a set of incoming neighbors $INSET(PIT_{n(j)}^i)$, from which router i has received an Interest for n(j); a set of outgoing neighbors $OUTSET(PIT_{n(j)}^i)$ to which router i has sent an Interest for n(j); the number of allowed retransmissions $rc(PIT_{n(j)}^i)$; and the remaining lifetime $RT(PIT_{n(j)}^i)$.

In embodiments of the present invention, when routers receive Interests, they first determine whether to accept the Interests using the Extended Look-up of FIB (ELF) rule, which states that a router i can accept an Interest $I_k[n(j)]$ from a neighbor k if one of the two following conditions is satisfied:

$$n(j) \notin PIT^i \wedge \exists v \in N^i(D(i,n(j)*,k) > D(i,n(j)*,v)); \quad \text{condition (1)}$$

$$n(j) \in PIT^i \wedge A\ D(i,n(j)*,k) > D(i,n(j)). \quad \text{condition (2)}$$

Condition (1) ensures that router i accepts an Interest from neighbor k only if router i determines that it can forward its new Interest for n(j) through a neighbor that is closer to name prefix n(j)* than neighbor k. Condition (2) ensures that router i accepts an Interest from neighbor k only if the distance from router i to n(j)* when it sent its Interest for n(j) is smaller compared to the distance from neighbor k to n(j)* when the Interest is received from neighbor k. The ELF rule is independent of the specific metric used to measure distances from routers to name prefixes (e.g., hop count), or whether one or multiple paths are maintained for a given name prefix.

Figure 5:
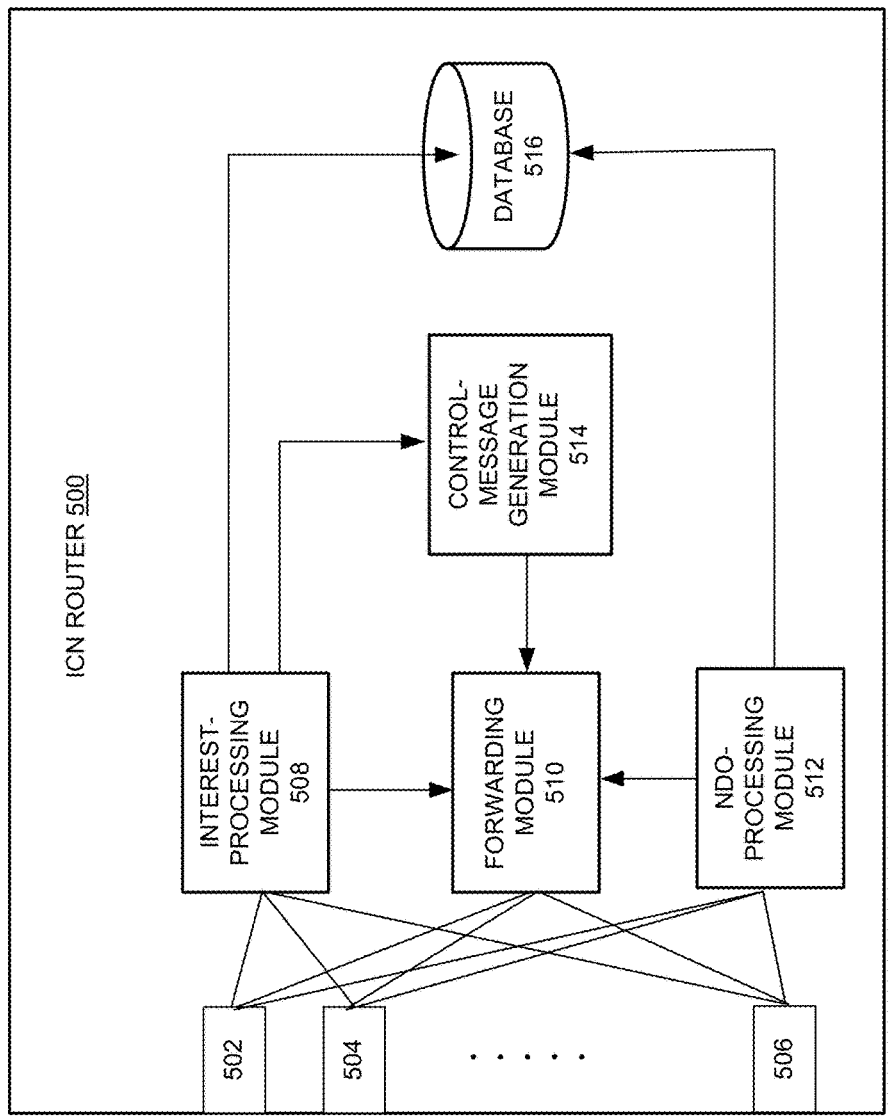
FIG. 5 presents a diagram presenting an exemplary architecture of an ICN router, in accordance with an embodiment of the present invention.

FIG. 5 presents a diagram presenting an exemplary architecture of an ICN router, in accordance with an embodiment of the present invention. In FIG. 5, ICN router 500 includes a number of faces, such as faces 502, 504, and 506; an Interest-processing module 508; a forwarding module 510; an NDO-processing module 512; a control-message generation module 514; and a database 516.

Faces 502-506 can include not only physical interfaces but also application processes capable of sending and receiving packets, including Interests and NDOs. Interest-processing module 508 is responsible for processing Interest messages received on the various faces. In some embodiments, Interest-processing module 508 can be configured to determine whether to accept an incoming Interest based on the aforementioned ELF rule. Forwarding module 510 is responsible for forwarding packets, such as Interests or Content Objects, to the faces. NDO-processing module 512 is responsible for processing NDO messages received in response to Interests. Control-message generation module 514 generates control messages, which can include different NACK messages. In some embodiments, control-message generation module 514 generates NACK messages under various conditions, including but not limited to when: an Interest loop is detected, no route is found toward the requested content, no content is found, and the PIT entry expires. Database 516 stores the three essential data structures: the Content Store, the Forwarding Information Base, and the Pending Information Table.

FIG. 6 presents a diagram illustrating an exemplary Interest-processing algorithm, in accordance with an embodiment of the present invention. Note that certain network traffic-control issues, such as load balancing of available paths to name prefixes, congestion-control, or the forwarding of an Interest over multiple paths concurrently, are beyond the scope of this disclosure and will not be discussed here. For simplicity, it is assumed that all Interest retransmissions are carried out on an end-to-end basis (i.e., by the consumers of content rather than by relaying routers). Hence, routers do not attempt to provide any "local repair" when a neighbor fails or a NACK to an Interest is received.

With reference to FIGS. 5-6, one can see that, when Interest-processing module 508 of a router i receives an Interest $I_k[n(j)]$ from a neighbor k, it first checks the Content Store $CS^i$ for a match. If a match is found, forwarding module 510 returns the matching NDO to neighbor k. Note that $D_i[n(j), sp(j)]$ denotes a Content-Object message sent in response to Interest $I_k[n(j)]$.

If no match is found in the Content Store and the PIT (line 5 in FIG. 6), Interest-processing module 508 checks the FIB for a match. If no match is found in the FIB, it is determined that no route exists to the requested content. In response, control-message generation module 514 generates a NACK message $NI_i[n(j)$, no route], stating that the NACK is issued because no route is found (line 6 in FIG. 6). Subsequently, forwarding module 510 forwards the NACK to neighbor k, and Interest-processing module 508 drops the received Interest (line 7 in FIG. 6).

If a match is found in the FIB, Interest-processing module 508 determines whether the aforementioned condition (1) is met, i.e., whether there exists a neighbor v, through which router i is closer to name prefix n(j)* than router k was when it sent its Interest. If so, it is determined that the Interest can be forwarded, and forwarding module 510 forwards the Interest based on the appropriate forwarding algorithm (lines 9-12 in FIG. 6). Moreover, a PIT entry is created for n(j) by adding router k to the incoming neighbor list and router v to the outgoing neighbor list. The remaining lifetime is set as the Maximum Interest Lifetime (MIL). The MIL assumed by a router before it deletes an Interest from its PIT is large enough to preclude an excessive number of retransmissions, yet not so large to cause the PITs to store too many Interests for which no NDO messages or NACKs can be sent due to failures or transmission errors. In some embodiments, the MIL is set in the range of a few seconds (e.g., between 1 and 10 seconds).

If condition (1) is not met, it is determined that the Interest may be traversing a loop. In response, control-message generation module 514 generates a NACK message $NI_i[n(j)$, loop], stating that the NACK is issued because a loop is found. Subsequently, forwarding module 510 forwards the NACK to neighbor k, and Interest-processing module 508 drops the received Interest (line 14 in FIG. 6).

If a match to the Interest name is found in the PIT, Interest-processing module 508 determines whether the aforementioned condition (2) is met, i.e., whether router i was closer to name prefix n(j)* than router k when both routers sent their Interests. If so, it is determined that the Interest can be aggregated. In response, the PIT is updated by adding router k to the set of incoming neighbors from which Interests for n(j) are received (lines 18-19 in FIG. 6). If condition (2) is not met, it is determined that the Interest may be traversing a loop. In response, control-message generation module 514 generates a NACK message $NI_i[n(j)$, loop], stating that the NACK is issued because a loop is found. Subsequently, forwarding module 510 forwards the NACK to neighbor k, and Interest-processing module 508 drops the received Interest (line 21 in FIG. 6).

The Interest-processing algorithm shown in FIG. 6 provides a simple Interest-forwarding strategy, in which router i simply selects the first neighbor v in the ranked list of neighbors stored in the FIB for prefix n(j)* that satisfies condition (1) of the ELF rule. More sophisticated strategies can also be devised to attain load balancing among multiple routes toward content. In addition, the same Interest can be forwarded over multiple paths concurrently. In such cases, content can be sent back over each path that the Interest traversed successfully. To be effective, however, these approaches require the adoption of a loop-free multi-path routing protocol in the control plane. For example, such a routing protocol may include distance-based routing. A detailed description of distance-based routing can be found in U.S. patent application Ser. No. 14/572,608, Attorney Docket No. PARC-20141078US01, entitled "SYSTEM AND METHOD FOR DISTANCE-BASED INTEREST FORWARDING," by inventor Jose J. Garcia-Luna-Aceves, filed Dec. 16, 2014, the disclosure of which is incorporated herein by reference in its entirety. Under distance-based routing, the control plane establishes valid multi-paths to content prefixes using long-term performance measures, and the data plane exploits those paths using the Hop-Count Forwarding with Aggregation Rule (HFAR) and short-term performance measurements, without risking the long delays associated with backtracking due to looping.

Exemplary Operations

Figure 7A:
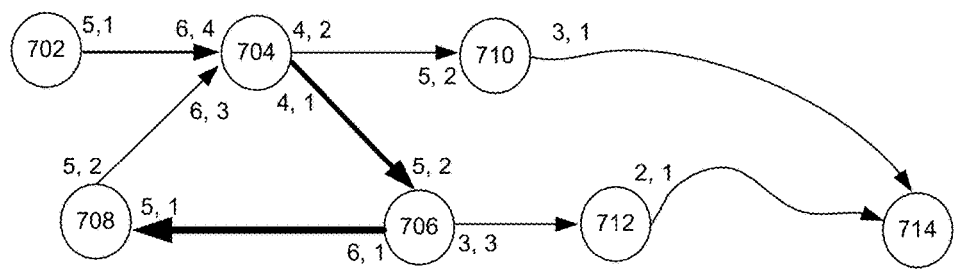
FIGS. 7A-7B illustrate an exemplary operation of Extended Look-up of FIB, in accordance with an embodiment of the present invention.
Figure 7B:
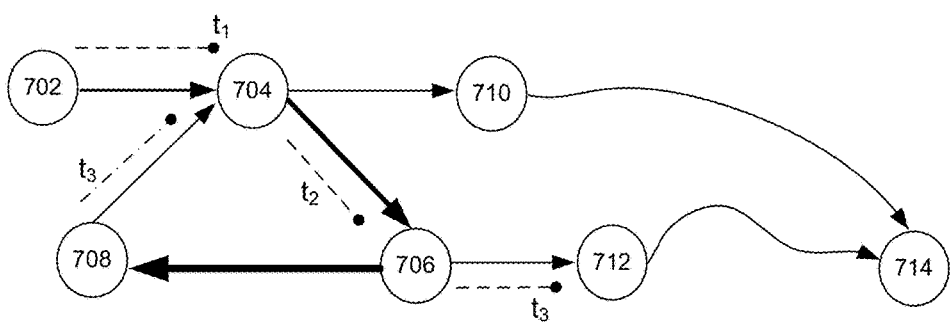

FIGS. 7A-7B illustrate an exemplary operation of CCN-ELF, in accordance with an embodiment of the present invention. More specifically, FIG. 7A illustrates the routing information as determined by the control plane, and FIG. 7B illustrates how Interests traverse the links. In the figures, network 700 includes a number of nodes, such as nodes 702-714, with arrowed lines indicating the next hops to content (with a name n(j)) advertised by router 714 according to the FIB entries stored in the routers. The line thickness of the arrowed lines indicates the perceived performance of a face. A thicker line pointing to a face means that the indicated face performs better than faces pointed to by thinner lines. For example, link (node 706, node 708) performs better than link (node 704, node 706). In the drawings, a pair of numbers is listed at each link outgoing from a router to its neighbors, indicating a distance (the first number) through the neighbor to n(j) (node 714) and the ranking of the neighbor according to the FIB of the router (the second number). In some embodiments, the distance can be the hop count. Note that for the same link there might be two pairs, with each pair being stored at the FIB in the router that is closer to the pair. For example, on the link from router 704 to router 706, two number pairs, pair (4, 1) and pair (5, 2), are shown next to the link. Number pair (4, 1) is adjacent to router 704 and is stored in the FIB of router 704, and number pair (5, 2) is adjacent to router 706 and is stored in the FIB of router 706. More specifically, the number pair (4, 1) adjacent to router 704 indicates that the hop count to n(j) via its neighbor 706 is 4, and neighbor 706 is ranked number 1 in the FIB of router 704. On the other hand, the number pair (5, 2) adjacent to router 706 indicates that the hop count from its neighbor 704 to n(j) is 5, and neighbor 704 is ranked number 2 in the FIB of router 706.

For notation purposes, a triplet (v, h, r) can be used to denote a face, its hop count, and its ranking. For example, the distances from node 704 to n(j) (node 714) based on the entries in $FIB^{node704}$ are (node 706, 4,1), (node 710, 4, 2), and (node 708, 6,3); the distances from node 706 to n(j) based on the entries in $FIB^{node706}$ are (node 708, 6,1), (node 704, 5, 2), and (node 712, 3, 3); and from node 708 to n(j) we have (node 704, 5, 2) and (node 706, 5,1).

FIG. 7B shows an Interest-forwarding scenario under CCN-ELF. In the example shown in FIG. 7B, router 704 receives an Interest I[n(j)] for name n(j) from router 702 at time $t_1$. Because router 706 offers the highest ranked distance to n(j) satisfying the ELF rule (i.e., D(node 704, n(j)*, node 706)=3<5=D(node 704, n(j)*, node 702)), router 704 forwards I[n(j)] to router 706. Router 704 then sets D(node 704, n(j))=4 in its PIT. Router 706 receives the Interest from router 704 at time $t_2$ and accepts it, because the ELF rule is also satisfied by at least one of its neighbors (i.e., D(node 706, n(j)*, node 712)=2<4=D(node 706, n(j)*, node 704)). Accordingly, router 706 forwards the Interest to router 712, which receives the Interest at time $t_3$. Also at time $t_3$, an Interest generated by router 708 is aggregated by router 704 because condition (2) of the ELF rule is satisfied (i.e., D(node 704, n(j)*, node 708)=5>4=D(node 704, n(j))). In contrast to the scenario shown in FIG. 2A, no loop occurs in FIG. 7A due to the implementation of CCN-ELF.

Figure 8A:
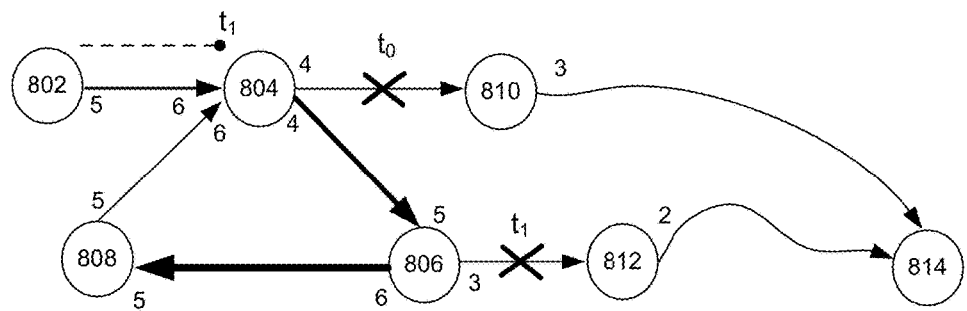
FIGS. 8A-8C illustrate an exemplary operation of Extended Look-up of FIB, in accordance with an embodiment of the present invention.
Figure 8B:
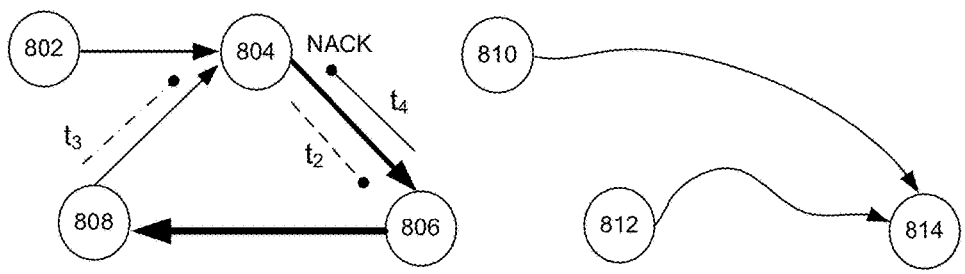
Figure 8C:
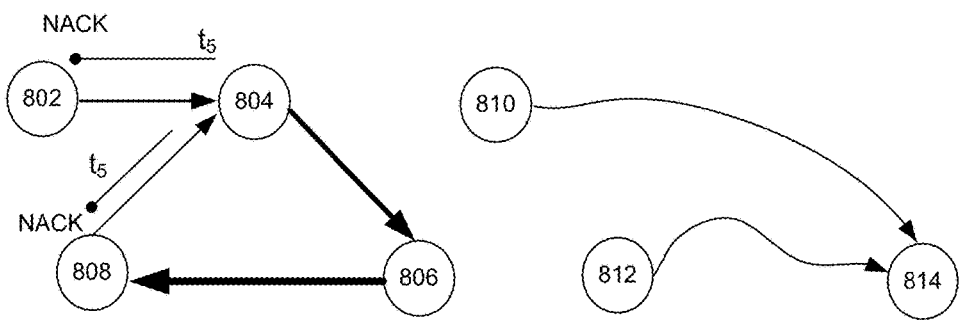

FIGS. 8A-8C illustrate an exemplary operation of CCN-ELF, in accordance with an embodiment of the present invention. More specifically, the example shown by FIGS. 8A-8C can be used to demonstrate how CCN-ELF operates when topology changes occur. In the figures, network 800 includes a number of nodes, such as nodes 802-814.

FIG. 8A shows that router 804 updates its FIB at time $t_0$ (when link (node 804, node 810) fails) and router 806 updates its FIB at time $t_1$ (when link (node 806, node 812) fails). Routers may have inconsistent FIB states for n(j) because routing-table updates are being sent in the control plane while Interests are being forwarded in the data plane. More specifically, FIG. 8A shows the snapshot of distance values stored in FIBs at the times Interests propagate after link (node 804, node 810) has failed (at time $t_0$) and while link (node 806, node 812) is failing (at time $t_1$). Note that the rankings of the distances are not shown in FIG. 8A. As shown in FIG. 8A, when the Interest for n(j) from router 802 arrives at router 804 at time $t_1$, router 804 forwards the Interest to router 806, because router 806 offers the highest ranked distance to n(j) satisfying condtion (1) of the ELF rule (i.e., D(node 804, n(j)*, node 806)=3<5=D(node 804, n(j)*, node 802)). After forwarding the Interest, router 804 sets D(node 804, n(j))=4 in its PIT.

FIG. 8B shows that, even though FIBs stored in the routers are inconsistent, router 806 sends a NACK to router 804 when the Interest for n(j) arrives at time $t_2$, because router 806 cannot find any neighbor that satisfies the ELF rule (i.e., any neighbor through which the distance to n(j) is less than 4). Router 804 aggregates the Interest from router 808 at time $t_3$, because condiction (2) of the ELF rule is satisfied (i.e., D(node 804, n(j)*, node 808)=5>4=D(node 804, n(j))). FIG. 8C shows that, at time $t_5$, router 804 forwards the NACK it receives from router 806 at time $t_4$ to routers 802 and 808. Note that Interests from routers 802 and 808 were aggregated.

Within a finite time, the FIBs of all routers are updated to reflect the new shortest paths that take into account the changes to links (node 804, node 810) and (node 806, node 812). Once FIBs are consistent, Interests regarding objects in the name prefix n(j)* are forwarded along the shortest paths toward n(j)*.

The ELF rule is only a sufficient condition to avoid Interest looping, and it is possible for a router to assume that an Interest is traversing a loop when it is not. In other words, false loop detections can happen. In the example in FIG. 8B, router 806 could forward the Interest to router 812 without causing a loop. However, the ELF rule is not satisfied by router 812 and router 806 cannot select it. Given the speed with which FIBs are updated to reflect correct distances computed in the control plane, false loop detections are rare; having false loop detections is better than having long-lasting PIT entries (e.g., entries for Interests that cannot receive responses due to looping, which eventually expire after many seconds). Hence, a sufficient condition for Interest loop detection is a good baseline for correct Interest forwarding in ICNs.

The performance benefits attained with CCN-ELF are considerable compared with those achieved using conventional ICNs (e.g., NDN or CCN). More specifically, PITs used in the CCN-ELF system are much smaller; furthermore, consumers experience smaller latencies obtaining content or receiving feedback regarding the content they request when routers implement CCN-ELF, instead of the conventional NDN forwarding strategy.

CCN-ELF requires additional FIB storage compared to conventional CCN or NDN systems, because the FIB now stores the distance information, e.g., the distance reported by each neighbor for each prefix n(j)*. This amounts to $(|D|)(|FIB^i|)(|N^1|)$ at router i, where D is the number of bytes needed to represent a distance, $|N^1|$ is the number of neighbors of router i, and $|FIB^i|$ is the number of entries in $FIB^i$. On the other hand, CCN-ELF also requires additional PIT overhead compared to the conventional NDN or CCN systems, because each PIT entry stores a distance. The PIT overhead corresponds to $(|D|)(|PIT^i|)$ bytes at router i.

Compared to a conventional CCN system, CCN-ELF requires additional storage for each FIB entry maintained for a name prefix and each PIT entry maintained for an Interest. The PITs could be simplified by not storing the nonces stated in Interests, given that CCN-ELF does not need nonces to detect Interest looping. Compared to a conventional NDN system, this represents storage savings of order $(|id|)(|PIT^i|)(|N^i|)$, where $|id|$ is the number of bytes needed to state a nonce. One can see that the additional storage required by CCN-ELF to maintain distance information can be more than compensated for by the storage savings derived from not having to store the nouces in the Interests.

CCN-ELF incurs the same end-to-end latencies as conventional NDN and CCN systems in the absence of routing-table loops in FIB entries, given that Interests and their replies traverse shortest paths. However, conventional NDN and CCN systems can incur much longer end-to-end delays than CCN-ELF for the retrieval of content or the reception of NACKs when Interests are aggregated along routing loops. It has been shown that, even if only a few Interests are aggregated along routing loops, undetected Interest loops can result in very large increases in the number of PIT entries stored in content routers and the end-to-end delays in obtaining content.

In conventional NDN and CCN systems, Interests that are aggregated along routing loops remain in the PIT until they expire before any NACKs can be sent to the Interest-issuing consumers. The resulting latency is on the order of seconds, because the lifetimes of Interests in the PITs typically are set that long to avoid unnecessary retransmissions of Interests. On the other hand, with CCN-ELF, a consumer can obtain either an NDO or a NACK in response to an Interest within a round-trip-time along the path between the customer and the router sending the NDO or detecting an Interest loop. This typically corresponds to a few hundred milliseconds in topologies similar to today's Internet. Furthermore, it can be shown that false detection of Interest loops does not impact significantly the Interest-forwarding efficiency. This is especially the case if loop-free multi-path routing to name prefixes is provided in the control plane.

Additional advantages provided by CCN-ELF include the packet format compatibility with conventional CCN and NDN systems.

Computer and Communication System

Figure 9:
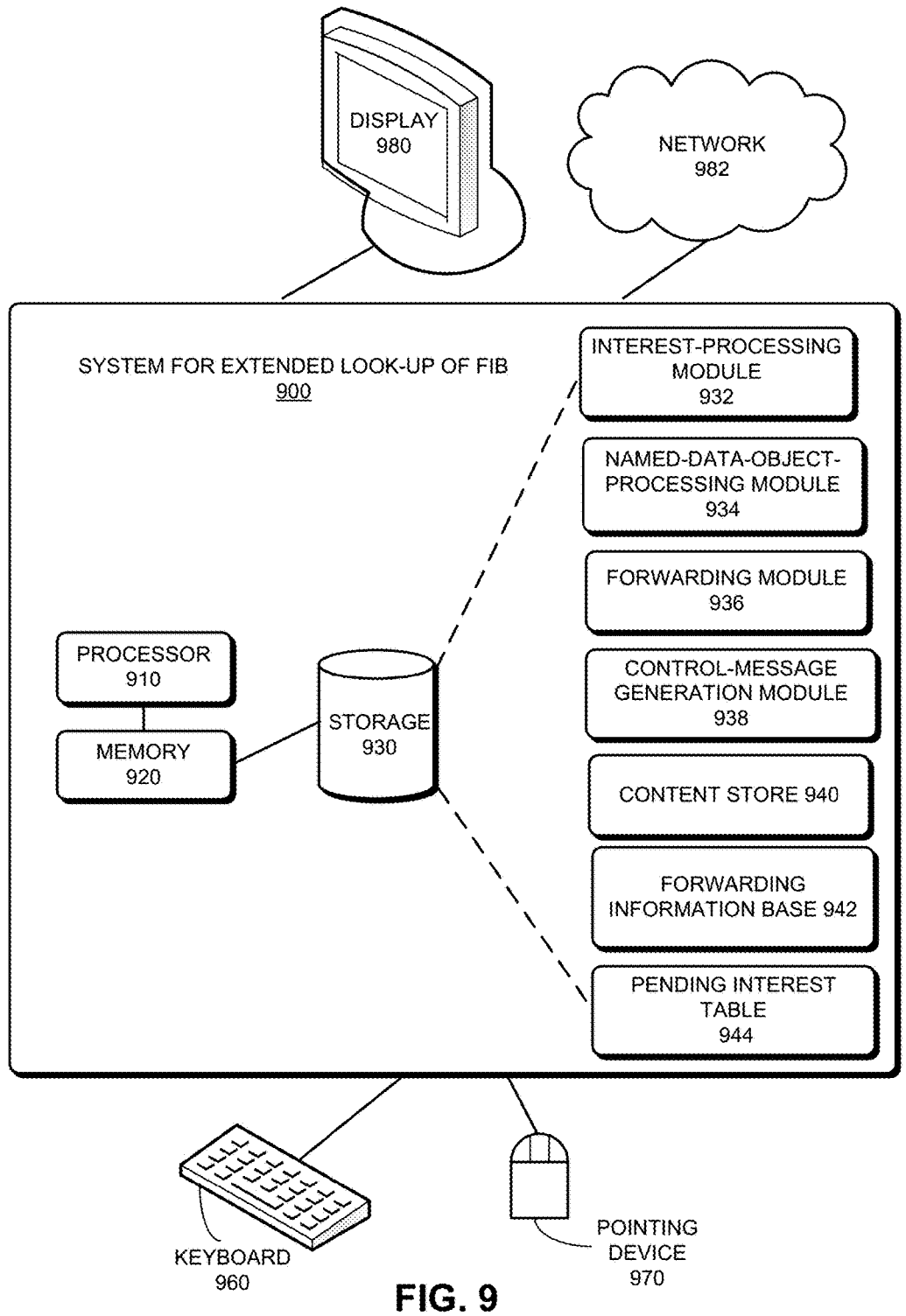
FIG. 9 illustrates an exemplary system for Extended Look-up of FIB, in accordance with an embodiment of the present invention.

FIG. 9 illustrates an exemplary system for Extended Look-up of FIB, in accordance with an embodiment of the present invention. A system 900 for Extended Look-up of FIB comprises a processor 910, a memory 920, and a storage 930. Storage 930 typically stores instructions that can be loaded into memory 920 and executed by processor 910 to perform the methods mentioned above. In one embodiment, the instructions in storage 930 can implement an Interest-processing module 932, a named-data-object-processing module 934, a forwarding module 936, and a control-message generation module 938, all of which can be in communication with each other through various means.

Storage 930 can further comprise a number of data structures, such as a Content Store 940, a Forwarding Information Base 942, and a Pending Interest Table 944.

In some embodiments, modules 932, 934, 936, and 938 can be partially or entirely implemented in hardware and can be part of processor 910. Further, in some embodiments, the system may not include a separate processor and memory. Instead, in addition to performing their specific tasks, modules 932, 934, 936, and 938, either separately or in concert, may be part of general- or special-purpose computation engines.

Storage 930 stores programs to be executed by processor 910. Specifically, storage 930 stores a program that implements a system (application) for Extended Look-up of FIB. During operation, the application program can be loaded from storage 930 into memory 920 and executed by processor 910. As a result, system 900 can perform the functions described above. System 900 can be coupled to an optional display 980 (which can be a touchscreen display), keyboard 960, and pointing device 970, and can also be coupled via one or more network interfaces to network 982.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-executable method for correctly processing interests in an information-centric network (ICN), the method comprising:
  receiving, by a first node in the ICN, an interest for a piece of content from a second node, wherein the interest specifies a name of the content piece;

determining, based on forwarding information, whether a forwarding condition is satisfied;

determining, based on information associated with pending interests stored on the first node, whether an interest aggregation condition is satisfied, wherein the interest aggregation condition is satisfied when a distance from the first node to a destination node is less than a distance from the second node to the destination node and wherein the information associated with pending interests comprises a number of allowed retransmissions and a remaining lifetime of the interest for a piece of content;

in response to the forwarding condition being satisfied, forwarding the interest;

in response to the interest aggregation condition being satisfied, aggregating the interest, wherein aggregating the interest comprises not forwarding the interest; and in response to neither the forwarding condition nor the interest aggregation condition being satisfied, dropping the interest and sending to the second node a control message indicating that the interest is traversing a loop.

2. The method of claim 1, wherein the forwarding information includes one or more entries associated with the name of the content piece, wherein a respective entry specifies a next hop neighbor through which the first node can forward the interest to a destination node storing the content piece, and wherein the entry further specifies a distance from the next hop neighbor to the destination node.

3. The method of claim 2, wherein the forwarding condition is satisfied if a distance specified by at least one entry of the forwarding information is less than a distance from the second node to the destination node.

4. The method of claim 2, wherein the entry further specifies a ranking of the next hop neighbor, and wherein the interest is forwarded to a next hop neighbor that is highest ranked among neighbors that satisfy the forwarding condition.

5. The method of claim 1, wherein the information associated with the pending interests further comprises an entry associated with the name of the content piece, and wherein the entry specifies a distance from the first node to the destination node storing the content piece.

6. The method of claim 5, wherein the entry further specifies a set of incoming neighbors from which interests for the content piece are received, and wherein the interest is aggregated by adding the second node to the set of incoming neighbors.

7. The method of claim 1, wherein the control message is a negative acknowledgement (NACK).

8. The method of claim 1, wherein the information associated with the pending interests further comprises a set of next hop neighbors.

9. A non-transitory computer-readable storage medium storing instructions that when executed by a computing device cause the computing device to perform a method for correctly processing interests in an information-centric network (ICN), the method comprising:

receiving, by a first node in the ICN, an interest for a piece of content from a second node, wherein the interest specifies a name of the content piece;

determining, based on forwarding information, whether a forwarding condition is satisfied;

determining, based on information associated with pending interests stored on the first node, whether an interest aggregation condition is satisfied, wherein the interest aggregation condition is satisfied when a distance from the first node to a destination node is less than a distance form the second node to the destination node, and wherein the information associated with pending interests comprises a number of allowed retransmissions and a remaining lifetime of the interest for a piece of content;

in response to the forwarding condition being satisfied, forwarding the interest;

in response to the interest aggregation condition being satisfied, aggregating the interest, wherein aggregating the interest comprises not forwarding the interest; and in response to neither the forwarding condition nor the interest aggregation condition being satisfied, dropping the interest and sending to the second node a control message indicating that the interest is traversing a loop.

10. The computer-readable storage medium of claim 9, wherein the forwarding information includes one or more entries associated with the name of the content piece, wherein a respective entry specifies a next hop neighbor through which the first node can forward the interest to a destination node storing the content piece, and wherein the entry further specifies a distance from the next hop neighbor to the destination node.

11. The computer-readable storage medium of claim 10, wherein the forwarding condition is satisfied if a distance specified by at least one entry of the forwarding information is less than a distance from the second node to the destination node.

12. The computer-readable storage medium of claim 10, wherein the entry further specifies a ranking of the next hop neighbor, and wherein the interest is forwarded to a next hop neighbor that is highest ranked among neighbors that satisfy the forwarding condition.

13. The computer-readable storage medium of claim 9, wherein the information associated with the pending interests further comprises an entry associated with the name of the content piece, and wherein the entry specifies a distance from the first node to the destination node storing the content piece.

14. The computer-readable storage medium of claim 13, wherein the entry further specifies a set of incoming neighbors from which interests for the content piece are received, and wherein the interest is aggregated by adding the second node to the set of incoming neighbors.

15. The computer-readable storage medium of claim 9, wherein the control message is a negative acknowledgement (NACK).

16. The computer-readable storage medium of claim 9, wherein the information associated with the pending interests further comprises a set of next hop neighbors.

17. A computer system for correctly processing interests in an information-centric network (ICN), the system comprising:

a memory for storing instructions associated with an interest-receiving module, an interest-processing module, a forwarding module, an interest aggregation module, and a control-message generation module;

a processor for executing the instructions, wherein executing the instructions causes the system to perform operations, comprising:

the interest-receiving module is configured to receive, by a first node in the ICN, an interest for a piece of content from a second node, wherein the interest specifies a name of the content piece;

the interest-processing module is configured to determine, based on forwarding information, whether a forwarding condition is satisfied, wherein the interest-processing module is further configured to determine, based on information associated with pending interests stored on the first node, whether an interest aggregation condition is satisfied, wherein the interest aggregation condition is satisfied when a distance from the first node to a destination node is less than a distance from the second node to the destination node, wherein the interest-processing module is further configured to drop the interest when neither the forwarding condition nor the interest aggregation condition is satisfied, and wherein the information associated with pending interests comprises a number of allowed retransmissions and a remaining lifetime of the interest for a piece of content;

the forwarding module is configured to forward the interest in response to the forwarding condition being satisfied;

the interest aggregation module is configured to aggregate the interest in response to the interest aggregation condition being satisfied, wherein aggregating the interest comprises not forwarding the interest; and the control-message generation module is configured, in response to neither the forwarding condition nor the interest aggregation condition being satisfied, to generate a control message indicating that the interest is traversing a loop and to send the control message to the second node.

18. The system of claim 17, wherein the forwarding information includes one or more entries associated with the name of the content piece, wherein a respective entry specifies a next hop neighbor through which the first node can forward the interest to a destination node storing the content piece, and wherein the entry further specifies a distance from the next hop neighbor to the destination node.

19. The system of claim 18, wherein the forwarding condition is satisfied if a distance specified by at least one entry of the forwarding information is less than a distance from the second node to the destination node.

20. The system of claim 18, wherein the entry further specifies a ranking of the next hop neighbor, and wherein the forwarding module is configured to forward the interest to a next hop neighbor that is highest ranked among neighbors that satisfy the forwarding condition.

21. The system of claim 17, wherein the information associated with the pending interests further comprises an entry associated with the name of the content piece, and wherein the entry specifies a distance from the first node to the destination node storing the content piece.

22. The system of claim 21, wherein the entry further specifies a set of incoming neighbors from which interests for the content piece are received, and wherein the interest aggregation module is configured to aggregate the interest by adding the second node to the set of incoming neighbors.

23. The system of claim 17, wherein the control message is a negative acknowledgement (NACK).

24. The system of claim 17, wherein the information associated with the pending interests further comprises a set of next hop neighbors.

* * * * *